(12) United States Patent
Do

(10) Patent No.: US 6,367,007 B1
(45) Date of Patent: Apr. 2, 2002

(54) USING SYSTEM CONFIGURATION DATA TO CUSTOMIZE BIOS DURING THE BOOT-UP PROCESS

(75) Inventor: Tri M. Do, Garden Grove, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/255,029

(22) Filed: Feb. 22, 1999

(51) Int. Cl.[7] .............................................. G06F 9/445
(52) U.S. Cl. ........................................................ 713/2
(58) Field of Search ............................................ 713/42

(56) References Cited

U.S. PATENT DOCUMENTS

| | | | | |
|---|---|---|---|---|
| 5,355,489 A | * | 10/1994 | Bealkowski et al. ........... | 713/2 |
| 5,938,764 A | * | 8/1999 | Klein ............................. | 713/1 |
| 5,938,765 A | * | 8/1999 | Dove et al. ..................... | 713/1 |
| 5,982,899 A | * | 11/1999 | Probst ........................... | 380/25 |
| 6,226,729 B1 | * | 5/2001 | Stevens et al. ............. | 713/1 X |
| 6,230,265 B1 | * | 5/2001 | Ahrens et al. ................. | 713/1 |
| 6,262,726 B1 | * | 7/2001 | Stedman et al. ............ | 713/1 X |

* cited by examiner

Primary Examiner—Thomas M. Heckler
(74) Attorney, Agent, or Firm—Fish & Richardson P.C.

(57) ABSTRACT

A computer includes an electronic storage device that stores configuration data indicating whether a first optional component and a second optional component are installed in the computer. The computer also includes an electronic memory device that stores BIOS code including code sections associated with operation of the first and second optional components. A processor executes the BIOS code and, upon doing so, is programmed to access the configuration data to determine if the first and second optional components are installed, to execute the section of the BIOS code associated with the first optional component only if the first optional component is installed, and to execute the section of the BIOS code associated with the second optional component only if the second optional component is installed.

29 Claims, 2 Drawing Sheets

USING SYSTEM CONFIGURATION DATA TO CUSTOMIZE BIOS DURING THE BOOT-UP PROCESS

TECHNOLOGICAL FIELD

The invention relates to computer systems and, in particular, to customizing system BIOS during the boot-up process.

BACKGROUND

The basic input/output system (BIOS) in an IBM-compatible personal computer system is the front-line component of the computer's operating system. Among the duties performed by the BIOS is the power-on self-test (POST), during which the computer's resources are tested and configured for operation. In many situations, system BIOS also provides runtime services for software applications, particularly those that require interrupt services.

In many system chipsets, system BIOS is customized to support non-standard system configurations offered by computer manufacturers. In general, a unique version of the system BIOS code is provided for each custom system configuration offered by the hardware manufacturers. In addition, the BIOS code includes several instructions, or "hooks," that are used to invoke microcode associated with a particular hardware manufacturer's custom configuration settings. This microcode, which is provided by the hardware manufacturer and known as "user binary," is typically stored in a writable read-only memory device, such as Flash ROM.

In some chipsets, including those found in many servers, the standard BIOS allows for slight variations in the system configuration. The BIOS inspects a data bit stored in the system's CMOS memory area that indicates whether a particular system component, such as a front panel controller, is to be installed. The BIOS executes the corresponding installation sequence only if the bit has a particular value. This feature is limited, however, by its dependency on CMOS memory. The BIOS reverts to a default setting when the data bit is unavailable or unreliable due to a condition such as CMOS corruption, CMOS clear, or uninitialized CMOS. This approach also limits hardware manufacturers to very few alternative system configurations.

SUMMARY

The inventor has developed a technique for using a single, uniform BIOS to support a wide variety of system configurations. This simplifies maintenance of the BIOS code base and eliminates the risk of providing an incorrect version of the BIOS code to a particular hardware manufacturer. Storing configuration data in a device such as Flash ROM eliminates CMOS dependency and allows large amounts of data corresponding to many alternative system configurations.

In one aspect, the invention features a computer that includes a processor, an electronic memory device to store BIOS code, and an electronic storage device, such as Flash ROM, to store configuration data. The configuration data indicates whether two optional components are installed in the computer. The BIOS code includes code sections that are associated with operation of the two optional components. In operation, the processor accesses the configuration data to determine if the two optional components are installed. The processor executes the section of the BIOS code associated with the first optional component only upon determining that the first optional component is installed. Likewise, the processor executes the section of the BIOS code associated with the second optional component only upon determining that the second optional component is installed.

In some embodiments, the configuration data is stored in consecutive individually addressable storage locations in the electronic storage device. The configuration data usually begins at a location having a predetermined address offset. In other embodiments, each byte of configuration data includes multiple bits dedicated to indicating which of the optional components are installed in the computer. The configuration data typically includes at least one data bit corresponding to each of the optional components in the group. Other embodiments include custom program code stored in the electronic storage device. This code, when executed with the BIOS code, enables operation of at least one of the optional components. In some cases, the electronic storage device also stores information indicating a checksum value for the configuration data.

In another aspect, the invention features an electronic storage device containing executable BIOS code for execution by a computer processor. When executing the BIOS code, the processor accesses a data storage device to obtain configuration data identifying optional components that are installed in the computer. The processor then executes those portions of the BIOS code that are associated with the optional components identified as being installed in the computer. The processor does not execute those portions of the BIOS code that are associated with the optional components that are not installed in the computer.

In another aspect, the invention features an electronic storage device, such as Flash ROM, in a computer system. The storage device includes individually addressable storage locations in which configuration data is stored, beginning at a location having a predetermined address offset. At least some bits of the configuration data are stored at bit addresses dedicated to storing information that indicates whether particular optional system components are installed in the computer system.

In yet another aspect, the invention features a method for use in configuring a computer for operation. The method involves accessing a memory device to retrieve program code that, when executed, forms a basic input/output system (BIOS) for the computer and that includes code sections associated with the operation of optional components. At the direction of the BIOS code, a data storage device is accessed to obtain configuration data identifying which of the optional components are installed in the computer. Those portions of the BIOS code associated with the installed components are executed. Those portions of the BIOS code associated with components that are not installed are not executed.

DETAILED DESCRIPTION

Figure 1:
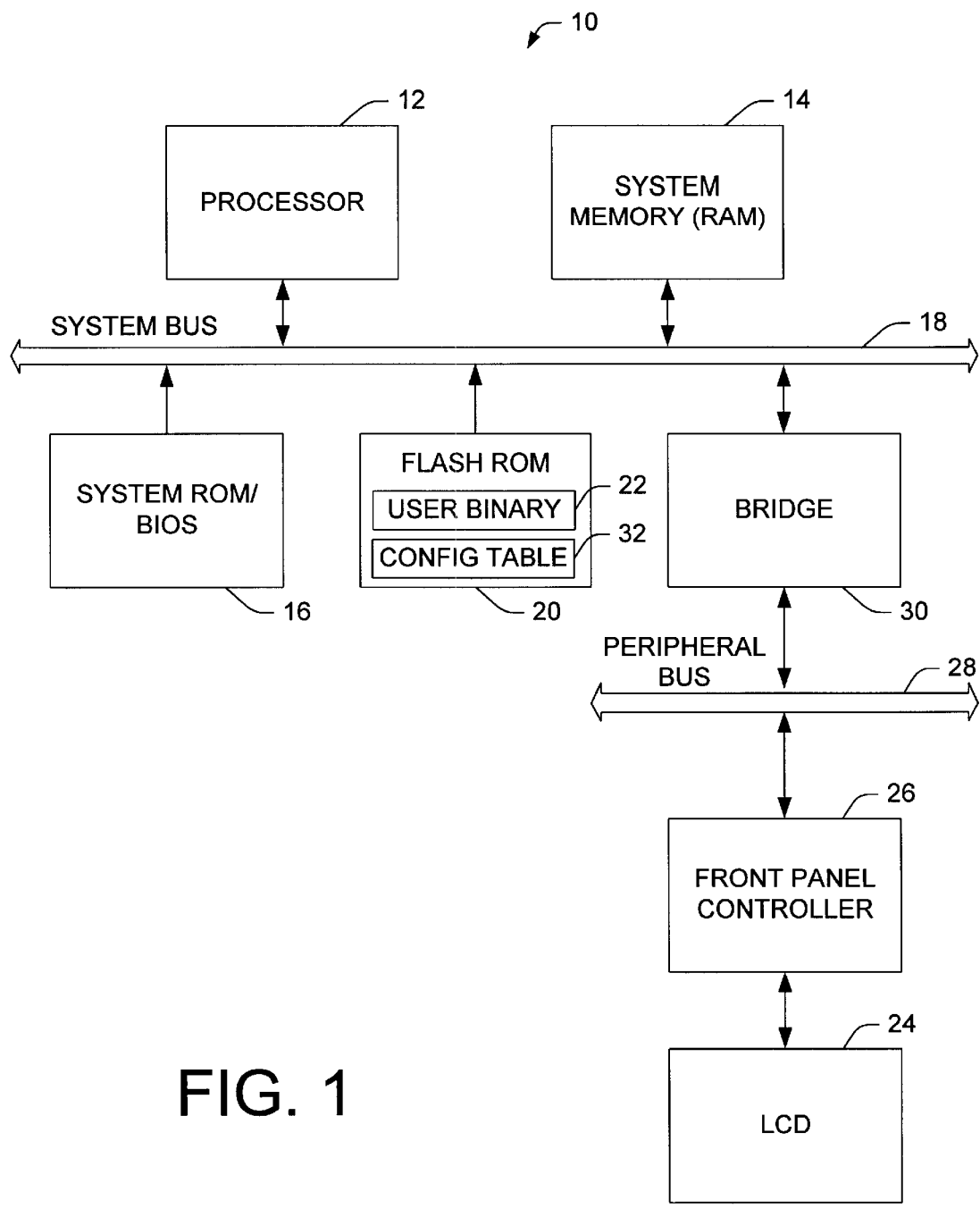
FIG. 1 is a block diagram of certain components of a computer system.

FIG. 1 shows several components of an IBM-compatible computer system 10, such as a network server PC. The computer 10 includes a central processor (CPU) 12, a volatile system memory device (system RAM) 14, and a non-volatile memory device (system ROM) 16, all connected to a system bus 18. The computer's BIOS code is stored in system ROM 16. An optional writable memory device, such as Flash ROM 20, stores user binary code 22 provided by the computer manufacturer to extend system BIOS to support custom system configurations. The computer 10 also includes other components, such as an LCD display 24 and a front panel controller 26, many of which are optional, that connect indirectly to the system bus 18 through one or more peripheral buses 28 and bridge devices 30.

One of the computer's data storage devices, typically the Flash ROM 20, stores a table 32 of system configuration data that indicates, among other things, which of the optional components are present in the system. System BIOS 16 tests and configures many of these components during the POST process. System BIOS 16 uses the data in the table 32 to indicate which optional POST tasks to perform. Upon power-up or system reset, the BIOS searches for a valid configuration table 32 in the Flash device and retrieves the configuration settings from the table 32. Based upon these settings, the BIOS performs the steps necessary to program, initialize, and configure the system. Unlike traditional BIOS, the BIOS here is not customized to support a particular system configuration. Rather, the BIOS includes code to support all recognized system configurations. The computer executes only those portions of the BIOS code necessary to carry out the system configuration that is specified by the configuration settings in the table 32.

The configuration table 32 has a uniform structure. This allows the BIOS to locate any data stored in the table, regardless of which hardware manufacturer provided the data. Likewise, the table 32 is stored at a predetermined storage address to facilitate data location. The table 32 typically is stored with the user binary code in the Flash ROM device 20. This reduces the number of system components dedicated to supporting the manufacturer's custom system configurations. Table I below provides an example of the structure and the types of data stored in a configuration table.

TABLE I

| Starting offset (HEX) | Length (byte) | Description | Default values |
|---|---|---|---|
| 2E | 4 | "$UUB" - User Binary Identification string | $UUB |
| 32 | 4 | Reserved | 0000H |
| 36 | 1 | Major revision of this UUB release | 01H |
| 37 | 1 | Minor revision of this UUB release | 00H |
| 38 | 2 | Offset of checksum byte | |
| 3A | 2 | Reserved | 00H |
| 3C | 4 | Product identification; product ID string; product code name | Optional 0000H |
| 40 | 1 | System hardware configuration; system hardware fab level<br>bit 7::4 - product family<br>bit 3::0 - board fab revision | 00H |
| 41 | 1 | Firmware controller installation byte:<br>0 = installed or enabled, 1 = not installed<br>bit 7::5 - reserved<br>    4 - Power Share Controller<br>    3 - Secondary Hotswap Backplane Ctrlr<br>    2 - Primary Hotswap Backplane Controller<br>    1 - Front Panel Controller<br>    0 - Baseboard Management Controller | 00H |
| 42 | 1 | Server Management sub-features:<br>0 = supported or enabled, 1 = not supported<br>bit 7::2 - reserved<br>    1 - Direct Platform Control<br>        (previously defined as EMP)<br>    0- Front Panel LCD | 00H |
| 43 | 1 | Fault Resilient Booting:<br>0 = supported or enabled, 1 = not supported<br>bit 7::3 - reserved<br>    2 - FRB 1 level<br>    1 - FRB 2 level<br>    0 - FRB 3 level | 00H |
| 44::57 | 20 | Reserved | 00H |
| 58 | Vary | Override error code table:<br>-Four bytes are defined for each record.<br>-0FFFFh indicates end of error table<br>    DW (4 digit error code, e.g., 8110H)<br>    DB (attribute byte, e.g., 0A9H)<br>    DB (reserved)<br>    ... repeated for more error code<br>    DW 0FFFFh (end of error table) | 0FFFFH |
| Specified at offset 38H | 1 | Checksum: starting at offset 2Eh | |

In this example, the table 32 begins at the hexadecimal address "2E" with a text string four bytes in length. This text string identifies the user binary code with which the table is associated. As shown in the table, the default value is "$UUB". Two bytes respectively located at the hex addresses "36" and "37" indicate the major and minor revision levels of the user binary release. A two-byte field at the hex address "38" points to the location of a byte containing the checksum for the configuration table. The checksum byte allows the BIOS to verify whether the data contained in the table is valid.

Two optional data fields appear at the hex addresses "3C" and "40" respectively. One of these fields is a four-byte field having a text string that identifies the product with which the user binary is associated. The hex value "0000" is placed in this field if no product identification string is included. The other field is a one-byte field identifying the product family and PC board fabrication level associated with the product. In this example, the four higher-order bits identify the product family; the four lower-order bits identify the fabrication level of the PC board associated with the chipset. This field also includes the hex value "0000" if no product family or board fabrication information is included.

The system configuration data begins at the hex address "41". The first field is a one-byte field that indicates which of several firmware controllers are to be installed or enabled by BIOS. In this example, five controllers are possible, including a power share controller, a secondary hotswap backplane controller, a primary hotswap backplane controller, a front panel controller, and a baseboard management controller. Each of these controllers is represented by one of the five lower-order bits in the byte, where the value of the bit indicates whether the corresponding controller is to be installed. A bit value of "0" indicates that the BIOS should execute the code required to install the controller; a bit value of "1" indicates that the controller is not to be installed. The three higher-order bits of this byte are reserved for future use.

The next data field is a one-byte field at the hex address "42" that indicates whether certain server management features, such as the direct platform controller (also known as the emergency management port) and the front panel LCD, are present in the system. This data field is followed by a one-byte field indicating whether BIOS must support any of three levels of fault resilient booting (FRB). In each of these data fields, data is stored in the lower-order bits, and the higher-order bits are reserved for future use. These data fields are followed by twenty bytes beginning at the hex address "44" that are reserved for future use, including support for optional system components added in the future.

The table also includes a data field of variable size, beginning at the hex address "58", in which the hardware manufacturer lists custom error codes that will override the standard POST error codes generated by the BIOS. The size of this data field depends on the number of error codes, if any, contained in the list. In this example, four bytes are dedicated to each custom error code entered by the hardware manufacturer. A hexadecimal value of "FFFF" indicates the end of the data field.

The last data field in the table is a one-byte field containing the checksum for the table. The two-byte field at the hex address "38", discussed above, contains the hex address of the location at which the checksum byte is stored.

Many of the data fields in the table have default values corresponding to a standard system configuration. For example, the firmware controller installation byte at hex address "41" has a default hex value of "00", which indicates that all of the optional controllers are to be installed by the BIOS. The default values are stored in these fields if the hardware manufacturer does not supply custom values.

Figure 2:
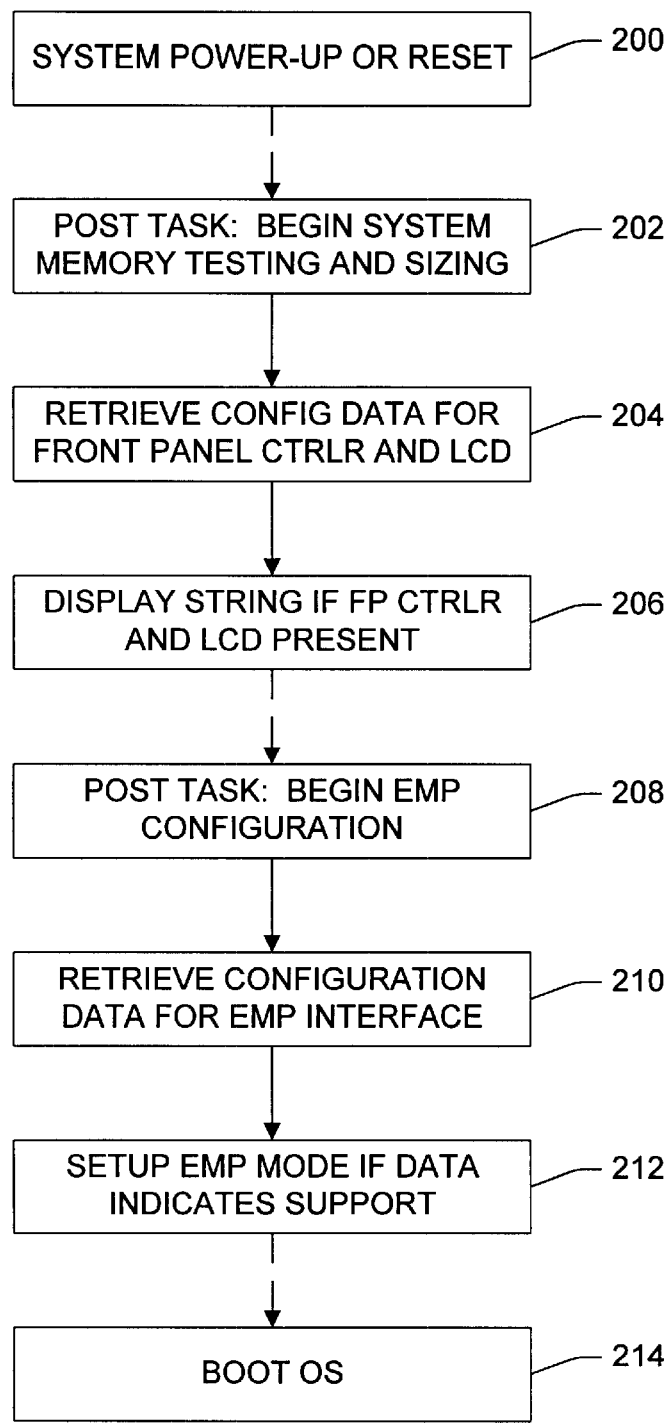
FIG. 2 is a partial flow chart for the execution of system BIOS while accessing a table of data indicating a system configuration to be supported by BIOS.

FIG. 2 illustrates selected portions of the BIOS execution flow in a server computer that includes the system configuration table. At some point after system power-up or reset (step 200), the BIOS begins a system memory testing and sizing task (step 202), during which it accesses the data in the configuration table to determine whether the system includes a front panel controller and a front panel LCD (step 204). In the example shown in Table I above, the BIOS must read the bytes at hex addresses "41" and "42", which indicate the specific components that are installed. If the configuration data indicates that these components are present, the BIOS displays the standard memory testing string on the front panel LCD (step 206). Otherwise, the BIOS completes the system memory testing and sizing task without attempting to display the memory testing string.

The BIOS then begins an emergency management port (EMP) configuration task (step 208). The BIOS again accesses the data in the configuration table to determine whether the EMP interface (or direct platform controller) is supported (step 210). If so, the BIOS configures the system for EMP mode (step 212). The BIOS proceeds to other POST tasks, accessing the data in the configuration table as needed to determine which optional system components are to be installed or enabled. The BIOS boots the operating system when all POST tasks are complete (step 214).

In many systems, the BIOS reads the configuration data directly from Flash ROM until system memory (RAM) has been tested and configured. The BIOS then copies the table into system memory and accesses the data from there. The BIOS in many systems also accesses the configuration data at application runtime for software applications that request BIOS services, such as interrupt services.

While the description above details certain embodiments of the invention, the invention is not limited to these embodiments. For example, the configuration table need not be coupled with the user binary code; in some systems the two may be stored in separate storage devices or in disparate portions of the same device. Likewise, many systems include configuration tables that differ greatly from the example shown above, accommodating fewer or many more optional system components than those shown. Moreover, in some systems the BIOS accesses the configuration data at points other than those shown above. For example, the BIOS in many systems uses the configuration data to determine even whether to perform system memory testing at all. Accordingly, other embodiments are within the scope of the following claims.

What is claimed is:

1. A computer comprising:
   an electronic storage device to store configuration data indicating whether at least a first optional component and a second optional component are installed in the computer;
   an electronic memory device to store BIOS code including code sections associated with operation of the first and second optional components; and
   a processor to access the configuration data to determine if the first and second optional components are installed, to execute the section of the BIOS code associated with the first optional component only upon determining that the first optional component is installed, and to execute the section of the BIOS code associated with the second optional component only upon determining that the second optional component is installed.

2. The computer of claim 1, wherein the configuration data is stored in consecutive individually addressable storage locations in the electronic storage device.

3. The computer of claim 2, wherein the configuration data begins at a location having a predetermined address offset.

4. The computer of claim 3, wherein the BIOS code instructs the processor to read the configuration data from the predetermined address offset.

5. The computer of claim 1, wherein each byte of configuration data includes multiple bits dedicated to indicating which of corresponding ones of the optional components are installed in the computer.

6. The computer of claim 1, wherein the configuration data includes at least one data bit corresponding to each of the optional components in the group.

7. The computer of claim 6, wherein the value of the data bit indicates whether the corresponding optional component is included in the computer.

8. The computer of claim 1, wherein the electronic storage device also contains custom program code that, when executed with the BIOS code, enables operation of at least one of the optional components.

9. The computer of claim 1, wherein the electronic storage device stores information indicating a checksum value for the configuration data.

10. The computer of claim 1, wherein the electronic storage device comprises writable, read-only memory (ROM).

11. The computer of claim 10, wherein the electronic storage device comprises Flash ROM.

12. An electronic storage device containing executable BIOS code that, when executed by a computer processor, causes the processor to:

access a data storage device to obtain configuration data identifying optional components that are installed in the computer;

execute those portions of the BIOS code that are associated with the optional components identified as being installed in the computer; and not execute those portions of the BIOS code that are associated with the optional components not installed in the computer.

13. The storage device of claim 12, wherein the BIOS code instructs the processor to read at least one bit of configuration data for each of the optional components in the group.

14. The storage device of claim 13, wherein the BIOS code instructs the processor to execute or not to execute the portion of the BIOS code associated with each of the optional components based on the value of the corresponding bit of configuration data.

15. The storage device of claim 13, wherein the writable, read-only device comprises Flash ROM.

16. The storage device of claim 12, wherein the BIOS code instructs the processor to read configuration data from individually addressable storage locations beginning at a location having a predetermined address offset.

17. The storage device of claim 12, wherein the BIOS code instructs the processor to access the data storage device to obtain information indicating a checksum for the configuration data.

18. The storage device of claim 12, wherein the BIOS code instructs the processor to obtain the configuration data from a writable, read-only device.

19. An electronic storage device in a computer system comprising:

individually addressable storage locations; and configuration data stored in the storage locations, beginning at a location having a predetermined address offset, at least some bits of which are stored at bit addresses dedicated to storing information indicating whether particular optional system components are installed in the computer system.

20. The storage device of claim 19, wherein the configuration data is stored in consecutive ones of the storage locations.

21. The storage device of claim 20, wherein the address of the first one of the consecutive storage locations is stored in another storage device in the computer.

22. The storage device of claim 19, further comprising data stored at one of the storage locations to indicate a checksum value for the configuration data.

23. The storage device of claim 19, wherein particular bits of the configuration data are dedicated to storing information indicating which of a plurality of hardware controllers are installed in the computer system.

24. The storage device of claim 19, wherein particular bits of the configuration data are dedicated to storing information indicating which of a plurality of hardware components are installed in the computer system.

25. A method for use in configuring a computer for operation, the method comprising:

accessing a memory device to retrieve program code that, when executed, forms a basic input/output system (BIOS) for the computer and that includes code sections associated with operation of a plurality of optional components;

at the direction of the BIOS code, accessing a data storage device to obtain configuration data identifying which of the optional components are installed in the computer;

executing those portions of the BIOS code associated with the optional components that are installed in the computer; and not executing those portions of the BIOS code associated with the optional components that are not installed in the computer.

26. The method of claim 25, comprising reading the configuration data from consecutive individually addressable storage locations in the data storage device.

27. The method of claim 25, comprising reading from the configuration data at least one data bit corresponding to each of the optional components in the group.

28. The method of claim 27, comprising reading the value of the data bit to determine whether the corresponding optional component is installed in the computer.

29. The method of claim 25, further comprising accessing the data storage device to retrieve custom program code that, when executed with the BIOS code, enables operation of at least one of the optional components.

* * * * *